(12) United States Patent
Yang

(10) Patent No.: US 10,030,152 B2
(45) Date of Patent: Jul. 24, 2018

(54) HIGH ELASTIC PRIMER COMPOSITION

(71) Applicant: Hyundai Motor Company, Seoul (KR)

(72) Inventor: Ji Won Yang, Seoul (KR)

(73) Assignee: Hyundai Motor Company, Seoul (KR)

( * ) Notice: Subject to any disclaimer, the term of this patent is extended or adjusted under 35 U.S.C. 154(b) by 121 days.

(21) Appl. No.: 14/869,356

(22) Filed: Sep. 29, 2015

(65) Prior Publication Data

US 2016/0185974 A1    Jun. 30, 2016

(30) Foreign Application Priority Data

Dec. 31, 2014  (KR) .................. 10-2014-0195116

(51) Int. Cl.
| | |
|---|---|
| *B32B 27/40* | (2006.01) |
| *C09D 5/00* | (2006.01) |
| *C09D 175/06* | (2006.01) |
| *C09D 161/28* | (2006.01) |
| *C09D 7/61* | (2018.01) |
| *C08K 3/30* | (2006.01) |
| *C08K 3/013* | (2018.01) |

(52) U.S. Cl.
CPC ............... *C09D 5/002* (2013.01); *C09D 7/61* (2018.01); *C09D 161/28* (2013.01); *C08K 3/013* (2018.01); *C08K 2003/3045* (2013.01)

(58) Field of Classification Search
None
See application file for complete search history.

(56) References Cited

U.S. PATENT DOCUMENTS

| | | | | |
|---|---|---|---|---|
| 4,694,051 | A | * 9/1987 | Kordomenos | ......... C08G 18/10 525/437 |
| 5,151,315 | A | 9/1992 | Ponnet | |
| 5,194,494 | A | 3/1993 | Henton et al. | |
| 2003/0191272 | A1* | 10/2003 | Flosbach | .............. B05D 3/0209 528/44 |

FOREIGN PATENT DOCUMENTS

| | | |
|---|---|---|
| EP | 0393003 A1 | 10/1990 |
| JP | 05-070749 A | 3/1993 |
| JP | 06-065467 A | 3/1994 |
| JP | H06256714 A | 9/1994 |
| JP | 3097989 B2 | 10/2000 |
| KR | 1995-0009157 B1 | 8/1995 |
| KR | 10-2002-0057171 A | 7/2002 |
| KR | 10-1277947 B1 | 6/2013 |

* cited by examiner

*Primary Examiner* — Michael J Feely

(74) *Attorney, Agent, or Firm* — Mintz Levin Cohn Ferris Glovsky and Popeo, P.C.; Peter F. Corless

(57) ABSTRACT

The present invention relates to a high elastic primer composition. The high elastic primer composition comprises: a hard urethane-modified polyester in an amount of about 10 to 20 wt %, a soft urethane-modified polyester in an amount of about 5 to 20 wt %, a polycaprolactone in an amount of about 1 to 10 wt %, a polymer resin 20 to 50 wt %, an extender pigment 0.1 to 20 wt % and a solvent 15 to 50 wt %, based on the total weight of the primer composition.

6 Claims, 2 Drawing Sheets

(a) Conventional Primer Paint

Coated Film Destruction by Impact of Incoming Stones
→Occurring Red Rust by Base Exposure (b) Primer Paint of Present Invention Spreading and Absorbing of Impact Energy
of Incoming Stones

HIGH ELASTIC PRIMER COMPOSITION

CROSS-REFERENCE TO RELATED APPLICATION

This application claims under 35 U.S.C. § 119(a) the benefit of Korean Patent Application No. 10-2014-0195116 filed on Dec. 31, 2014, the entire contents of which are incorporated herein by reference.

TECHNICAL FIELD

The present invention relates to a high elastic primer composition. The high elastic primer composition may include a soft urethane-modified polyester containing a soft segment and a polycaprolactone, such that impact absorption of the coated film with the primer may be improved detachment of the coated film and exposure of a base may be reduced, thereby giving high elasticity, high tenacity and flexibility and at the same time, minimizing red rust phenomenon occurring after chipping.

BACKGROUND

Typically, exterior coated film of a vehicle basically has structure of an electro-deposition layer, a primer layer, a base layer and a clear layer. Particularly, the primer layer is a coated film giving chipping resistance, however, a conventional primer coated film layer used in a vehicle body may have an inferior quality such as red rust phenomenon occurring by detachment of the coated film and excessive exposure of a base (e.g. iron sheet) after chipping, and therefore, customer satisfaction has dropped. Herein, the chipping resistance may mean a degree of damage caused by incoming small pieces of stones, a deicing salt, sand and the like during driving.

In the related arts, Japanese Patent Publication No. 3,097, 989 discloses a polyurethane coating composition comprising a polyol-based reaction product, which contains low viscosity aliphatic or aromatic polyisocyanate having two or more isocyanate functional groups. However, the polyurethane coating composition may provide high elasticity and high tenacity to a coated film by using a mixture of hard urethane-modified polyol and soft urethane-modified polyol at all.

Further, U.S. Pat. No. 5,151,315 discloses a multi-layered composite material consisting of a middle layer including polycaprolactone and an outer layer including two polyurethanes. However, the multi-layered composite material may not include aromatic diisocyanate, and urethane polymers comprising a hard segment and a soft segment.

Thus, there is a need for a paint, which can prevent complete detachment of the coated film up to the electro-deposition layer even if the coated film is damaged by incoming stones, absorb most of impact at the primer layer, and minimize detachment of the coated film and red rust phenomenon after chipping at the same time.

The above information disclosed in this Background section is only for enhancement of understanding of the background of the invention and therefore it may contain information that does not form the prior art that is already known in this country to a person of ordinary skill in the art.

SUMMARY

In preferred aspect, the present invention provides a primer composition to address the above mentioned problems in the related art. Particularly, when a soft urethane-modified polyester containing a soft segment and polycaprolactone is added to the primer composition, impact absorption of the primer coated film itself may be improved, and detachment of the coated film and exposure of a base may be reduced, thereby minimizing occurrence of red rust phenomenon after chipping.

In one aspect, the present invention provides a high elastic primer composition, such that internal stress of a coated film with the primer composition may be relieved and flexibility may be improved. Further, the present invention provides a high elastic primer composition having improved chipping resistance.

In an exemplary embodiment, the present invention provides a high elastic primer composition, which may include: a hard urethane-modified polyester in an amount of about 10 to 20 wt %, a soft urethane-modified polyester in an amount of about 5 to 20 wt %, a polycaprolactone in an amount of about 1 to 10 wt %, a polymer resin in an amount of about 20 to 50 wt %, an extender pigment in an amount of about 0.1 to 20 wt % and a solvent in an amount of about 15 to 50 wt %, based on the total weight of the primer composition.

The soft urethane-modified polyester may comprise a soft segment formed by adding aromatic diisocyanate. In particular, the aromatic diisocyanate may be added in an amount of about 5 to 10 wt % based on the total weight of the soft urethane-modified polyester.

The polymer resin may be at least one selected from the group consisting of Blocked Isocyanate (B.I), epoxy resin and melamine.

The extender pigment suitably may be, for example, $BaSO_4$.

The solvent may be aromatic hydrocarbons, esters or a mixture thereof.

The primer composition may further comprise: an organic pigment in an amount of about 0.1 to 10 wt %, titanium dioxide in an amount of about 0.01 to 1 wt %, a surface modifier in an amount of about 0.1 to 1 wt %, a dispersant in an amount of about 0.1 to 1 wt %, a storage stabilizer in an amount of about 0.1 to 1 wt % and a thickening additive in an amount of about 0.1 to 5 wt %, all such wt % based on the total weight of the primer composition.

Further provided are vehicles that comprise the high elasticity primer composition as described above. For example, the primer composition may be coated on an exterior of vehicle body as a primer layer, and may be applied on an electro-deposition layer of the exterior coating film. Further, a base layer of the exterior coating film may be coated on the primer layer comprising the primer composition of the present invention. Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
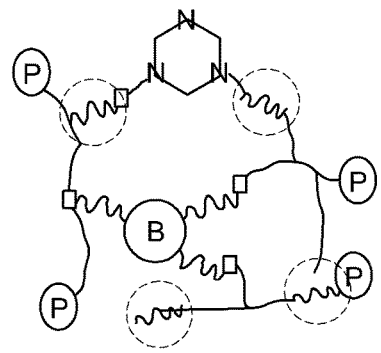
FIG. 1 illustrates a chemical structure of an exemplary soft urethane-modified polyester according to an exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The high elastic primer composition of the present invention may include: a hard urethane-modified polyester in an amount of about 10 to 20 wt %, a soft urethane-modified polyester in an amount of about 5 to 20 wt %, a polycaprolactone in an amount of about 1 to 10 wt %, a polymer resin in an amount of about 20 to 50 wt %, an extender pigment in an amount of about 0.1 to 20 wt % and a solvent in an amount of about 15 to 50 wt %, all such wt % based on the total weight of the primer composition.

The high elastic primer composition may improve impact absorption of the coated film itself with the primer composition as described above by adding the soft urethane-modified polyester and the caprolactone, thereby reducing detachment of a coated film and exposure of a base (e.g. iron sheet). Thus, red rust phenomenon occurring after chipping may be minimized. Further, when a vehicle has poor chipping resistance in terms of structure, restriction of leading angle in designing a vehicle body may be reduced due to improved impact absorption of the coated film.

In particular, the hard urethane-modified polyester may contain a hard segment, and when the hard urethane-modified polyester is mixed with the soft urethane-modified polyester and then applied in the primer composition or as paint components, elasticity and tenacity to the coated film may be substantially improved. When the content of the hard urethane-modified polyester is less than about 10 wt %, other important physical properties of the paint may be deteriorated, and when it is greater than about 20 wt %, chipping resistance may be deteriorated.

The soft urethane-modified polyester may contain a soft segment, which may be formed by adding aromatic diisocyanate. In particular, the aromatic diisocyanate may be added in an amount of about 5 to 10 wt %, based on the total weight of the soft urethane-modified polyester. Further, the soft segment may improve bonding strength between resins due to its mesh structure.

The terms "hard urethane" or "soft urethane", as used herein, may be determined polymer morphology such as formation of polyurethane fibers, physical or chemical properties of elastomers, adhesives, or certain structural characteristics. In certain embodiments, the hard urethane or soft urethane may be determined based on the relative elastic properties thereof. For example, the hard urethane may be stiff and immobile while the soft urethane may be more flexible and mobile relative to the hard urethane, and such difference may depend on content of elastomeric chain extender in polymer structure. Further, in certain embodiments, "hard segment" and "soft segment", as used herein, means a flexible and mobile polymeric property. For example, the hard segment may be formed by rigid (short) chain diol (e.g. chain length of about 1 to 8 carbons) so as to have a high polarity or a substantially increased density of urethane groups of high polarity. Meanwhile, the soft segment, may be formed with flexible longer-chain diol (e.g. chain length of greater than about 8 carbons) such that the soft segment may have a low polarity or a substantially reduced density of urethane groups.

FIG. 1 is an exemplary chemical structure of the soft urethane-modified polyester according to an exemplary embodiment of the present invention. As shown in FIG. 1, the part shown in dotted circle shows the soft segment. The soft segment can give high tenacity to the paint, and prevent destruction of the coated film by impact, by spreading around or absorbing impact energy applied to the coated film. When the content of this soft urethane-modified polyester is less than about 5 wt %, other important physical properties of the paint may be deteriorated, and when it is greater than about 20 wt %, the coated film may be pushed.

The polycaprolactone is a compound expressed by the following Chemical Formula. The polycaprolactone has a structure of substantial mobility, thereby relieving internal stress and flexibility of the coated film. When the content of the polycaprolactone is less than about 1 wt %, flexibility of the coated film may be deteriorated, and when it is greater than about 10 wt %, the coated film may be pushed.

Chemical Formula

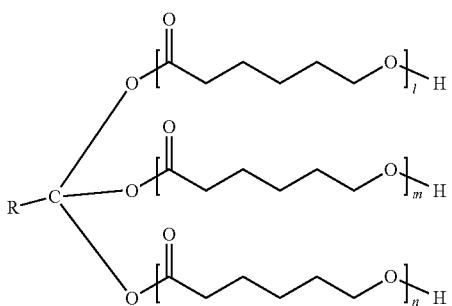

In Chemical Formula I, R may be H, or alkyl, suitably having, for example, 1 to 12 carbon atoms; and each 1, m, and n is same or different, and is a positive integer.

Figure 2:
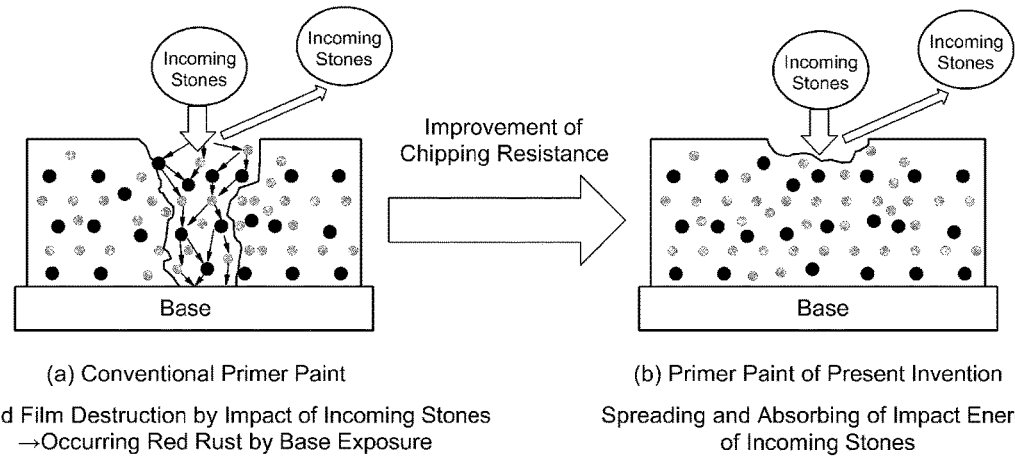
FIG. 2 illustrates a conventional primer paint (a) and an exemplary primer paint by improving chipping property according to an exemplary embodiment the present invention (b)

FIG. 2 illustrates a conventional primer paint (a) and an exemplary paint comprising an exemplary primer composition having improved chipping property according to an exemplary embodiment of the present invention (b).

The polymer resin may be at least one selected from the group consisting of Blocked Isocyanate (B.I), epoxy resin and melamine. Particularly, the polymer resin may include B.I in an amount of about 1 to 10 wt %, epoxy resin in an amount of about 5 to 20 wt % and melamine in an amount of about 10 to 20 wt %, all such wt % based on the total weight of the primer composition. When the content of the B.I is less than about 1 wt %, flexibility of the coated film may be deteriorated, and when it is greater than about 10 wt, the coated film may not be hardened. When the content of the epoxy resin is less than about 5 wt %, adhesiveness of the paint may be deteriorated, and when it is greater than about 20 wt %, tenacity of the coated film may be deteriorated. Further, when the content of the melamine resin is less than about 10 wt %, the coated film may not be hardened, and when it is greater than about 20 wt %, quality of the coated film exterior may be deteriorated.

The extender pigment may be, but not limited to, $BaSO_4$. When content of the $BaSO_4$ is less than 0.1 wt % based on the total weight of the primer composition, it may be difficult to embody color of the coated film, and when it is greater than about 20 wt %, major physical properties of the coated film may be deteriorated.

The solvent may be aromatic hydrocarbons, esters or a mixture thereof. In particular, the solvent may be aromatic hydrocarbon-based solvent in an amount of about 10 to 30 wt %, ester-based solvent in an amount of about 5 to 20 wt %, or a mixture thereof. When the content of the aromatic hydrocarbon-based solvent is less than about 10 wt %, dispersibility of the paint may be deteriorated, when it is greater than about 30 wt %, quality of the coated film exterior may be deteriorated. Further, when the content of the ester-based solvent is less than about 5 wt %, dispersibility of the paint may be deteriorated, and when it is greater than about 20 wt %, fluidity of the paint may be deteriorated.

The primer composition may further comprise an organic pigment in an amount of about 0.1 to 10 wt %, titanium dioxide in an amount of about 0.01 to 1 wt %, a surface modifier in an amount of about 0.1 to 1 wt %, a dispersant of in an amount of about 0.1 to 1 wt %, a storage stabilizer in an amount of about 0.1 to 1 wt % and a thickening additive in an amount of about 0.1 to 5 wt %, all such wt % values based on total weight of the paint primer composition.

Particularly, the organic pigment may be yellow, red or black pigments. When the content of the organic pigment is less than about 0.1 wt %, it may be difficult to embody color of the coated film, and when it is greater than about 10 wt %, the color may be darker than the required color. Likewise, when the content of the titanium dioxide is out of the range, it may be difficult to embody color of the coated film.

When the content of the surface modifier is less than about 0.1 wt %, the coated film may be rough, and when it is greater than about 1 wt %, quality of the coated film exterior may be deteriorated. In addition, when the content of the dispersant is less than about 0.1 wt %, ingredients in the paint may be cohered, and when it is greater than about 1 wt %, quality of the coated film exterior may be deteriorated.

Further, when the content of the storage stabilizer is less than about 0.1 wt %, storage stability of the paint may be deteriorated, and when it is greater than about 1 wt %, quality of the coated film exterior may be deteriorated. When the content of the thickening additive is less than about 0.1 wt %, the coated film formation may be incomplete, and when it is greater than about 5 wt %, storage stability of the paint may be deteriorated.

The primer composition according to various exemplary embodiments of the present invention can give high elasticity and high tenacity to the coated film by mixing the hard urethane-modified polyester containing the hard segment (giving elasticity) and the soft urethane-modified polyester (giving high tenacity) and then applying thereof as a paint material. Further, internal stress may be relieved and flexibility may be improved by adding the polycaprolactone to the paint. Further, by improving impact absorption of the primer coated film itself using the high elastic primer paint of the present invention, detachment of the coated film and exposure of the base (e.g. iron sheet) may be reduced, thereby red rust phenomenon occurring after chipping can be minimized. Further, when a vehicle has poor chipping resistance in terms of structure, restriction of leading angle in designing a vehicle body may be reduced by improving impact absorption of the primer coated film.

EXAMPLES

The following examples illustrate the invention and are not intended to limit the same.

Example 1

As shown in the following Table 1, a hard urethane-modified polyester in an amount of 13.8 wt %, a soft urethane-modified polyester in an amount of 12 wt %, B.I in an amount of 3.02 wt %, an epoxy resin in an amount of 6.46 wt %, polycaprolactone in an amount of 2.63 wt %, melamine in an amount of 17.71 wt %, titanium dioxide in an amount of 0.03 wt %, an extender pigment in an amount of 8.99 wt %, an organic pigment in an amount of 2.26 wt %, a surface modifier in an amount of 0.39 wt %, a dispersant in an amount of 0.30 wt %, a storage stabilizer in an amount of 0.22 wt %, a thickening additive in an amount of 1.66 wt %, an aromatic hydrocarbon-based solvent in an amount of 20.08 wt % and an alcohol-based solvent in an amount of 10.45 wt %, all wt % based on the total weight of the primer paint composition, were mixed to manufacture a primer paint composition. Then, the primer paint composition was coated on a material to be coated, and then hardened at a temperature of 80° C. for 30 min to manufacture a primer paint.

Example 2 and Comparative Examples 1 and 2

The procedure of Example 1 was repeated except for using ingredients and composition ratio as shown in the following Table 1 to manufacture a primer paint.

TABLE 1

| Ingredient (wt %) | | Comparative Example 1 | Comparative Example 2 | Example 1 | Example 2 |
|---|---|---|---|---|---|
| Resin | Hard Urethane Modified Polyester | 14.29 | 15.73 | 13.80 | 12.96 |
| | Soft Urethane Modified Polyester | — | 13.68 | 12.0 | 11.26 |
| | Polyester | 16.43 | — | — | — |
| | B.I | — | 1.44 | 3.02 | 3.65 |
| | Epoxy Resin | 4.10 | 5.36 | 6.46 | 8.53 |
| | Polycaprolactone | — | — | 2.63 | 4.12 |
| | Melamine | 17.56 | 18.19 | 17.71 | 17.84 |
| Pigment | Titanium Dioxide(TiO$_2$) | 0.03 | 0.03 | 0.03 | 0.02 |
| | Extender Pigment (BaSO$_4$) | 10.70 | 10.25 | 8.99 | 8.44 |
| | Organic Pigment (Red-type) | 2.69 | 2.58 | 2.26 | 2.13 |
| Additives | Surface Modifier | 0.47 | 0.45 | 0.39 | 0.37 |
| | Dispersant | 0.36 | 0.34 | 0.30 | 0.28 |
| | Storage Stabilizer | 0.26 | 0.25 | 0.22 | 0.21 |
| | Thickening Additive | 1.97 | 1.89 | 1.66 | 1.56 |
| Solvent | Aromatic Hydrocarbons | 20.77 | 19.89 | 20.08 | 18.83 |
| | Esters | 10.37 | 9.92 | 10.45 | 9.80 |
| Total | | 100 | 100 | 100 | 100 |

* surface modifier: Silicone Modified Acryl
* Dispersant: Polyester
* Storage Stabilizer: Polyethylene Oxide Colloid
* Thickening Additive: Styrenes Test Example In order to confirm physical properties of the primer paints manufactured in Examples 1 and 2, and Comparative Examples 1 and 2, tests were conducted as follows. The tests were evaluated in a state of a specimen, and the results were shown in the following Table 2.

1) Evaluation of Impact Resistance

Dropping distance was measured using a Du Pont impact tester.

2) Evaluation of Adhesiveness

A perforated line was drawn to reach the base side of the coated film using a cutter, to make 100 2 mm×2 mm squares, and an adhesive cellophane tape was attached to the surface thereof and rapidly detached at 90°, and then the number of the remained coated film in the square boxes was checked.

3) Evaluation of Water Resistance and Moisture Resistance

A specimen was exposed for a regulated time using a temperature-controlled constant temperature water tank, adhesiveness test was conducted, and then the number of the detached coated film was checked.

4) Evaluation of Sat Spray Resistance

A specimen was exposed for a regulated time using a salt spray resistance tester, and then detachment and swelling and the like of the coated film at the cross cut part.

5) Evaluation of Chipping Resistance

Stone chips were sprayed using a chipping resistance tester, and then the degree of the coated film detachment was confirmed.

TABLE 2

| Major Evaluation Items | Requirement (Based on Clear Standard for Vehicle Body of Our Company) | Evaluation Result | | | |
|---|---|---|---|---|---|
| | | Comparative Example 1 | Comparative Example 2 | Example 1 | Example 2 |
| Coated Film Thickness (Primer/Base/Clear) | 30 ± 2 μm/ Recommended Film Thickness/ 40 ± 2 μm | 32/13/41 | 31/15/39 | 32/13/40 | 31/11/40 |
| Gloss | 20-Degree Method 88 or Higher | 88 | 88 | 88 | 89 |
| Exterior Quality | SOLID (Horizontal/Vertical): 75/65 or Higher METALLIC (Horizontal/Vertical): 65/60 or Higher | 70/66 | 69/65 | 69/63 | 67/63 |
| Fluidity/ Pinhole Limit/ Smooth Limit | 40 μm or Higher/ 55 μm or Higher/ 20 μm or Less | 40/55/19 | 41/55/19 | 40/55/20 | 40/55/19 |
| Impact Resistance | Du Pont 500 g, 20 cm or Higher | 50 | 30 | 40 | 30 |
| Adhesiveness | Baduk Nunmok Method M-2.5 or Higher | M-1 | M-1 | M-1 | M-1 |
| Water Resistance/ Moisture Resistance | No Exterior Problem, Baduk Nunmok Method M-2.5 or Higher | M-1 | M-1 | M-1 | M-1 |
| Scratch Resistance | Initial Gloss Retention 55% or Higher | 57 | 55 | 55 | 58 |
| Accelerated Weathering Resistance | 90% or Higher/ M-2.5 or Higher/ 3.0 or Less | 98/M-1/0.7 | 97/M-1/0.6 | 92/M-1/0.4 | 93/M-1/0.5 |

TABLE 2-continued

| Major Evaluation Items | Requirement (Based on Clear Standard for Vehicle Body of Our Company) | Evaluation Result | | | |
|---|---|---|---|---|---|
| | | Comparative Example 1 | Comparative Example 2 | Example 1 | Example 2 |
| (Gloss Retention/ Adhesiveness/ Color Difference) Salt Spray Resistance | (WHITE-Type 1.0 or Less) Adhesiveness/Exterior: No Detachment Except One Side 3 mm | Good | Good | Good | Good |
| Chemical Resistance | No Coated Film Decoloration, Swelling, Softening Etc. | Good | Good | Good | Good |
| Chipping Resistance | Target: Grade 2 or Better | Grade 3 | Grade 3 (Target Achieved) | Grade 2 (Target Not Achieved) | Grade 2 Target Not Achieved) |

According to the result of Table 2, it could be confirmed that the primer paints manufactured in Examples 1 and 2 satisfy the coating material standard on an equal level with the primer paints of Comparative Examples of conventional products in terms of physical properties such as impact resistance, adhesiveness, moisture resistance/water resistance, scratch resistance, salt spray resistance and chemical resistance. Particularly, it could be found that in reference to chipping resistance, both of Examples 1 and 2 achieved the target of Grade 2.

Figure 3A:
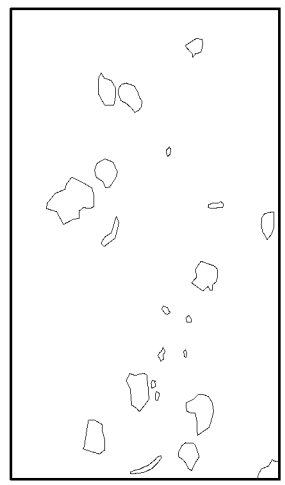
FIGS. 3A-3B show an exemplary primer paint manufactured in Comparative Example and an exemplary primer paint manufactured in Example according to an exemplary embodiment of the present invention.
Figure 3B:

FIG. 3A shows an exemplary primer paint manufactured in Comparative Example above and FIG. 3B shows an exemplary primer paint manufactured in Example according to an exemplary embodiment of the present invention. As shown in FIGS. 3A-3B, it could be confirmed that in the case of the primer paint of Example, red rust phenomenon was much relieved due to improved chipping resistance, as compared to the primer paint of Comparative Example.

Thus, it could be confirmed that the primer paints having high elasticity manufactured in Examples can improve chipping resistance by satisfying the existing physical properties for coating such as impact resistance, adhesiveness, scratch resistance, and also giving high elasticity, high tenacity and flexibility to the coated film, by adding the soft urethane-modified polyester containing a soft segment and the polycaprolactone to the primer composition.

The high elastic primer composition according to the present invention has advantages as follows:

1) The high elastic primer composition can give high elasticity and high tenacity to the coated film by mixing the hard urethane-modified polyester containing a hard segment so as to give elasticity and the soft urethane-modified polyester so as to high tenacity and then applying thereof as the paint. Further, the primer composition can relieve internal stress and improve flexibility by adding the polycaprolactone to the paint.

2) The high elastic primer composition can reduce detachment of the coated film and exposure of the base, for example, iron sheet by improving impact absorption of the primer coated film itself using the primer paint composition, such that red rust phenomenon occurring after chipping can be minimized.

3) The high elastic primer composition can relieve restriction of leading angle in designing a vehicle body by developing a paint for improving chipping resistance, although a vehicle having poor chipping resistance in terms of structure.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A primer composition, comprising:
   a hard urethane-modified polyester in an amount of about 10 to 20 wt %;
   a soft urethane-modified polyester in an amount of about 5 to 12 wt %;
   a polycaprolactone in an amount of about 1 to 10 wt %;
   a polymer resin in an amount of about 20 to 50 wt %;
   an extender pigment in an amount of about 0.1 to 20 wt %; and
   a solvent in an amount of about 15 to 50 wt %,
   wherein all wt % are based on the total weight of the primer composition,
   wherein the soft urethane-modified polyester comprises a soft segment formed by adding aromatic diisocyanate, and
   the aromatic diisocyanate is added in an amount of 5 to 10 wt %, based on the total weight of the soft urethane-modified polyester.

2. The primer composition of claim 1, wherein the polymer resin is at least one selected from the group consisting of Blocked Isocyanate (B.I), epoxy resin and melamine.

3. The primer composition of claim 1, wherein the extender pigment is $BaSO_4$.

4. The primer composition of claim 1, wherein the solvent is aromatic hydrocarbons, esters or a mixture thereof.

5. The primer composition of claim 1, further comprising:
   an organic pigment in an amount of about 0.1 to 10 wt %;
   titanium dioxide in an amount of about 0.01 to 1 wt %;
   a surface modifier in an amount of about 0.1 to 1 wt %;
   a dispersant in an amount of about 0.1 to 1 wt %;
   a storage stabilizer in an amount of about 0.1 to 1 wt %; and
   a thickening additive in an amount of about 0.1 to 5 wt %,
   wherein all wt % are based on the total weight of the primer composition.

6. A vehicle that comprises a primer composition of claim 1.

* * * * *